United States Patent
Wang

(10) Patent No.: US 11,704,143 B2
(45) Date of Patent: Jul. 18, 2023

(54) INFORMATION PROCESSING APPARATUS, METHOD OF CONTROLLING THE SAME, AND STORAGE MEDIUM

(71) Applicant: Canon Kabushiki Kaisha, Tokyo (JP)

(72) Inventor: Xiaoli Wang, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 294 days.

(21) Appl. No.: 17/167,230

(22) Filed: Feb. 4, 2021

(65) Prior Publication Data

US 2021/0240505 A1 Aug. 5, 2021

(30) Foreign Application Priority Data

Feb. 5, 2020 (JP) .................... 2020-018214

(51) Int. Cl.
*G06F 9/455* (2018.01)
*G06F 3/12* (2006.01)

(52) U.S. Cl.
CPC ........ *G06F 9/45533* (2013.01); *G06F 3/1203* (2013.01); *G06F 3/123* (2013.01); *G06F 2009/45579* (2013.01); *G06F 2009/45595* (2013.01)

(58) Field of Classification Search
CPC ....... G06F 9/45533; G06F 2009/45579; G06F 2009/45595
See application file for complete search history.

(56) References Cited

U.S. PATENT DOCUMENTS

| | | | |
|---|---|---|---|
| 10,503,448 B1* | 12/2019 | Chhabra | G06F 9/44505 |
| 10,642,545 B2 | 5/2020 | Wang | |
| 10,838,756 B2 | 11/2020 | Singh et al. | |
| 2007/0168387 A1* | 7/2007 | Matoba | H04N 1/0035 |
| 2011/0167405 A1* | 7/2011 | Min | G06F 8/36 717/107 |
| 2013/0151996 A1* | 6/2013 | Nario | H04W 12/06 715/760 |
| 2016/0044201 A1* | 2/2016 | Fujisawa | H04N 1/00954 358/1.9 |
| 2016/0062801 A1* | 3/2016 | Hatano | G06F 9/5011 718/104 |
| 2016/0344881 A1* | 11/2016 | Ando | H04N 1/00464 |
| 2017/0026535 A1* | 1/2017 | Tarumi | H04L 47/808 |
| 2018/0115675 A1* | 4/2018 | Ikeda | H04N 1/4406 |
| 2018/0232253 A1* | 8/2018 | Michimura | G06F 9/4881 |
| 2018/0232263 A1* | 8/2018 | Shimizu | G06F 9/542 |
| 2018/0285199 A1* | 10/2018 | Mitkar | G06F 11/2048 |
| 2018/0349271 A1* | 12/2018 | Takahashi | G06F 9/45533 |

FOREIGN PATENT DOCUMENTS

JP 2019149192 A 9/2019

* cited by examiner

*Primary Examiner* — Dong U Kim

(74) *Attorney, Agent, or Firm* — Venable LLP

(57) ABSTRACT

An information processing apparatus and a method of controlling the information processing apparatus are provided. The information processing apparatus is operable to install and execute an application for providing an extended function, obtains, from a server, a containerized application linked to a logged-in user or designated by a user and stores the obtained application in a storage. The apparatus weights the application stored in the storage in accordance with a characteristic or a usage state of the application and deletes an application stored in the storage based on the weighting in accordance with a logout of the user.

12 Claims, 9 Drawing Sheets

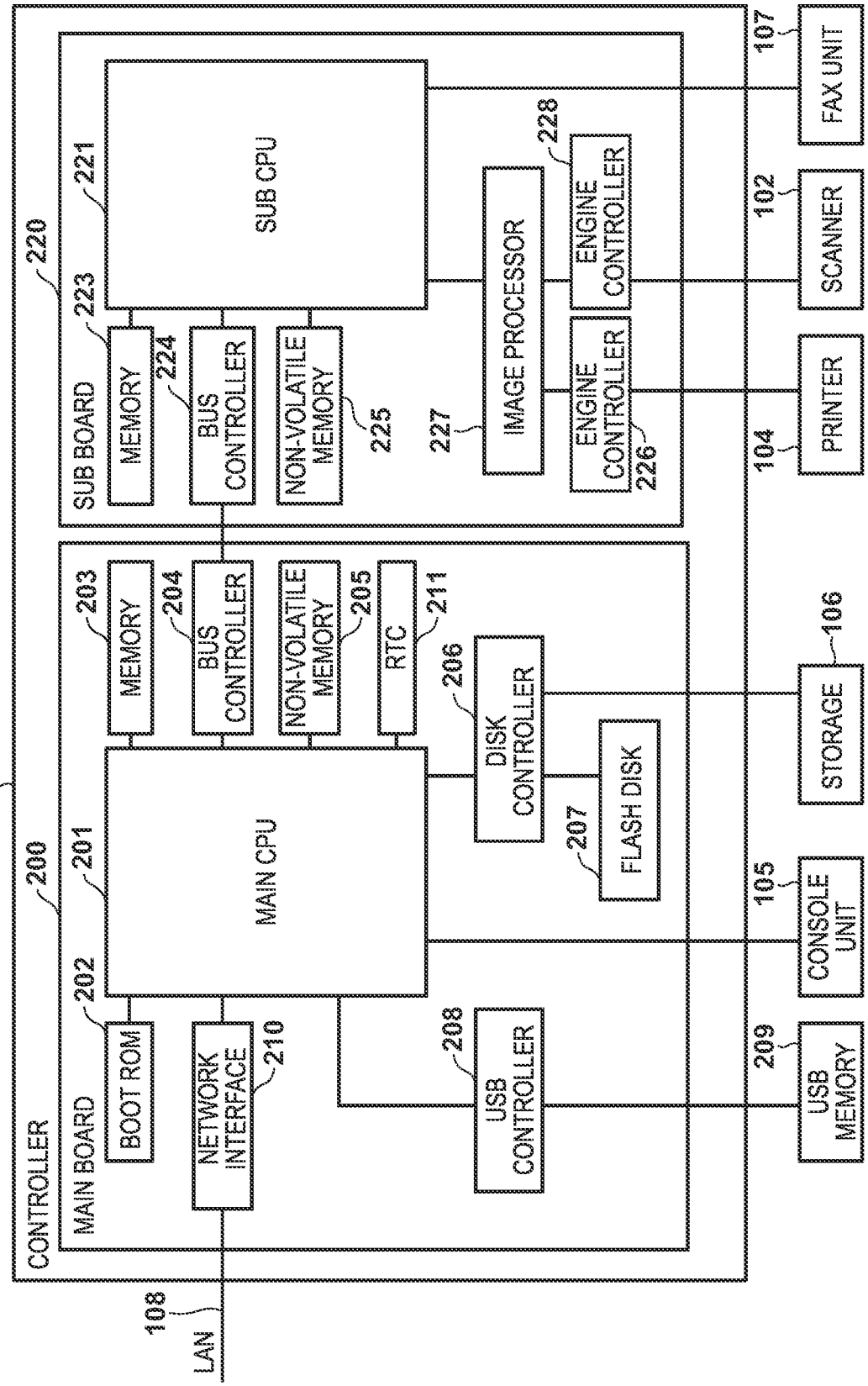

FIG. 7A

| ROLE | OCCUPATION TYPE |
|---|---|
| EXECUTIVE | ACCOUNTING |
| MANAGERIAL STAFF | PLANNING |
| REGULAR STAFF | HUMAN RESOURCES |
| COMMISSION | MARKETING |
| ... | INTELLECTUAL PROPERTY |
| ... | RESEARCH AND DEVELOPMENT |
| | QUALITY ASSURANCE |
| | MANUFACTURING |
| | SALES |
| | ... |

FIG. 7B

| CLASSIFICATION | DESCRIPTION |
|---|---|
| FUNDAMENTAL APPLICATION | APPLICATION THAT ANYONE CAN USE |
| GROUP APPLICATION | APPLICATION THAT IS NECESSARY IN GROUP WHICH IS BELONGED TO |
| PERSONAL APPLICATION | APPLICATION THAT USER DESIGNATED |
| OTHER APPLICATION | OTHER APPLICATION |

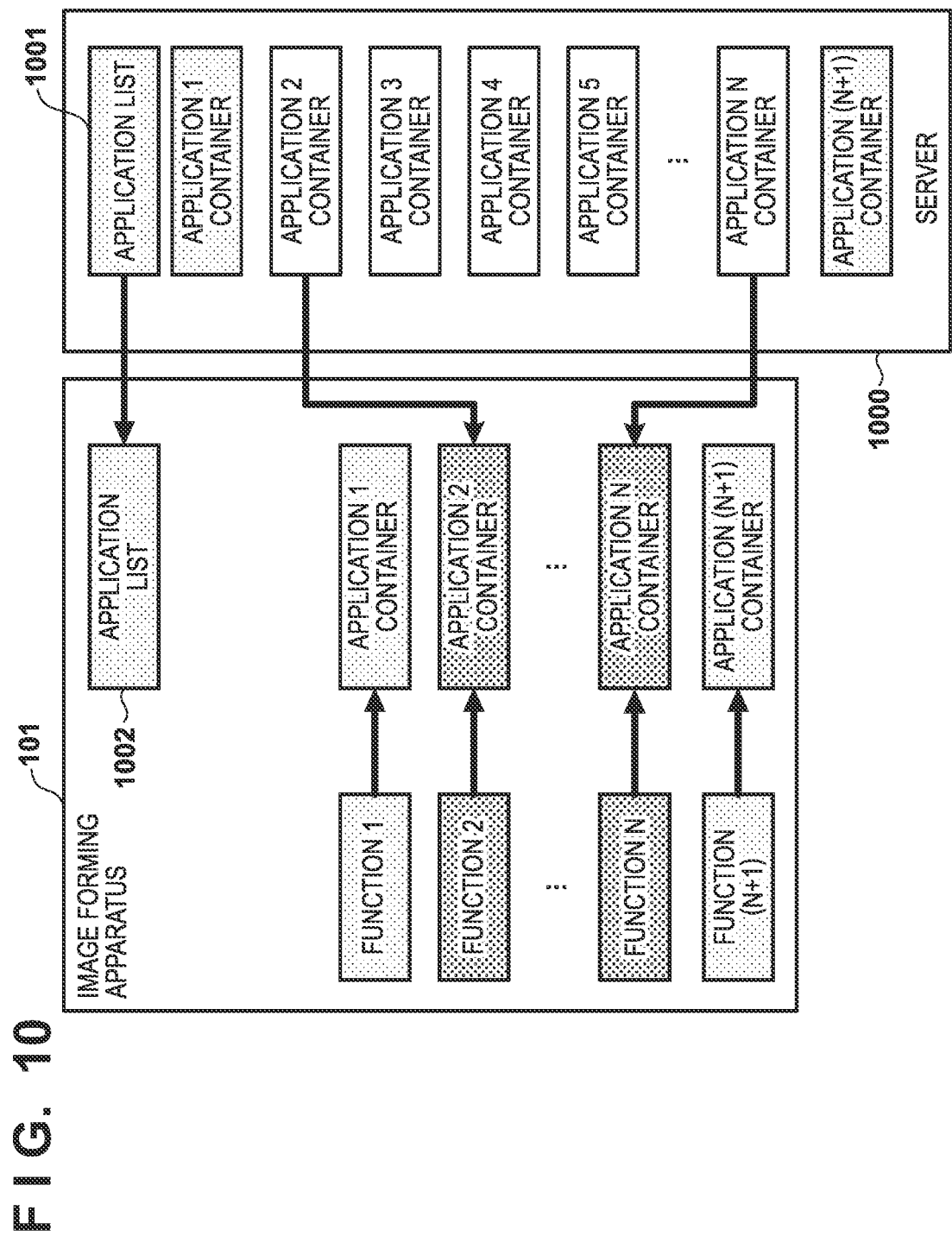

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method for controlling the same, and a storage medium.

Description of the Related Art

In electronic devices, by installing an application, it is possible to add new, separate functions in addition to fundamental functions that they originally have. For example, in a smartphone, by downloading an extension application from an application store, it is possible to add a new function to the smartphone. Also, even in the generation before smartphones, by installing an application to a personal computer, it is possible to add functions that can be executed by the personal computer. Similarly, even in an image forming apparatus such as a printer, by installing a new application as in a case of a personal computer, smartphone, or the like, it is possible to add its functions.

In recent years, a technique called the container technique by which it is possible to package necessary software components and operate them anywhere, in any execution environment, has been proposed. For example, Japanese Patent Laid-Open No. 2019-149192 discloses a technique by which it is possible to easily manage and adjust software by managing resources by tasks configured in a plurality of containers rather than by a unit of container.

Originally, hardware resources have been limited in image forming apparatuses designed for realizing fundamental functions such as copying and printing. Accordingly, if an application that can utilize an extended function is installed in the image forming apparatus in advance, it is not possible to allocate capacity in a storage of the image forming apparatus so as to be able to store a large capacity application. In particular, in a case of an image forming apparatus that many users use, although it is necessary to install a large amount of applications in order to support the needs and use cases of the various users, it is not possible to install these applications into the image forming apparatus due to the storage capacity.

SUMMARY OF THE INVENTION

An aspect of the present invention is to eliminate the above-mentioned problem with conventional technology.

A feature of the present invention is to provide a technique by which it is possible to prevent a decrease of free memory capacity of a storage due to an integrated application.

According to a first aspect of the present invention, there is provided an information processing apparatus operable to install and execute an application for providing an extended function, the information processing apparatus comprising: at least one processor and at least one memory configured to function as: an obtaining unit that obtains, from a server, a containerized application linked to a logged-in user or designated by a user; a storing unit that stores the application obtained by the obtaining unit; a weighting unit that performs weighting for the application stored in the storing unit in accordance with a characteristic or a usage state of the application; and a deleting unit that deletes an application stored in the storing unit based on the weighting in accordance with a logout of the user.

According to a second aspect of the present invention, there is provided a method of controlling an information processing apparatus operable to install and execute an application for providing an extended function, the method comprising: obtaining, from a server, a containerized application linked to a logged-in user or designated by a user; and storing in a memory the obtained application; performing a weighting for the application stored in the memory in accordance with a characteristic or a usage state of the application; and deleting the application stored in the memory based on the weighting in accordance with a logout of the user.

According to a third aspect of the present invention, there is provided a computer-readable storage medium storing a program for causing a processor to execute a method of controlling an information processing apparatus operable to install and execute an application for providing an extended function, the method comprising: obtaining, from a server, a containerized application linked to a logged-in user or designated by a user; and storing in a memory the obtained application; performing a weighting for the application stored in the memory in accordance with a characteristic or a usage state of the application; and deleting an application stored in the memory based on the weighting in accordance with a logout of the user Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram for describing a hardware configuration of a controller of the image forming apparatus according to the embodiment.

FIGS. 7A and 7B depict views illustrating one example of a classification of profiles and applications of a user in the image forming apparatus according to the embodiment.

FIG. 10 depicts a view for describing obtainment of an application in the image forming apparatus according to the embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Also, a plurality of features may be arbitrarily combined. Note that in the embodiments below, an example of an information processing apparatus is given as an example of an image forming apparatus.

Figure 1:
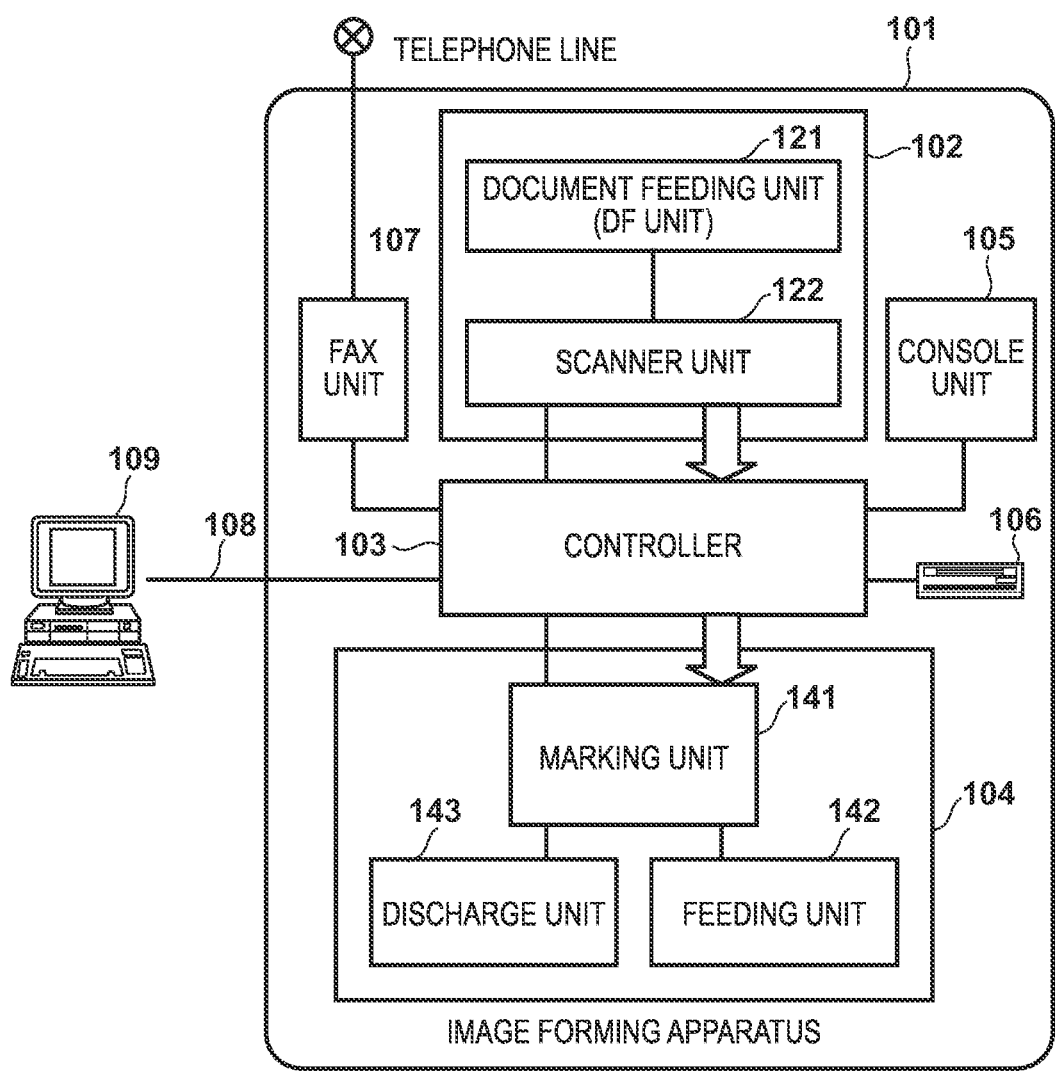
FIG. 1 is a block diagram for describing a hardware configuration of an image forming apparatus according to an embodiment of the present invention.

FIG. 1 is a block diagram for describing a hardware configuration of an image forming apparatus 101 according to an embodiment of the present invention.

A scanner 102 optically reads an image of a document and converts it into digital image data. A printer 104 forms (prints) an image on a sheet based on the digital image data. A console unit 105 accepts a user operation related to the image forming apparatus 101 and presents various information to the user. Note that, the console unit 105 may have a display unit having a touch panel function. A storage 106 is a large-capacity storage device for storing the digital image data, a control program, and the like. The storage 106 includes, for example, a hard disk drive (an HDD), an SD memory, or the like. A facsimile unit 107 transmits/receives digital image data by facsimile via a telephone line and the like. A controller 103 can execute various jobs on the image forming apparatus 101 by connecting to each previously described unit and controlling each unit. Also, the image forming apparatus 101 can perform transmission/reception of the digital image data and the like with a computer 109 via a LAN 108. Also, the computer 109 can issue jobs to the image forming apparatus 101 and perform instruction of the image forming apparatus 101 and the like.

The scanner 102 has a document feeding unit 121 that loads a document bundle and can feed a document automatically and a scanner unit 122 that optically scans the document and converts it into digital image data, and the converted image data is transmitted to the controller 103. The printer 104 has a feeding unit 142 that can feed sheets one by one from a sheet bundle, a marking unit 141 for printing the image data onto fed sheet, and a discharge unit 143 for discharging sheet after printing.

Also, the computer 109 instructs the controller 103 via the LAN 108 to execute jobs. In this embodiment, by the computer 109 transmitting an OFF instruction to the controller 103, the controller 103 can control an OFF process that turns off the power of the image forming apparatus 101.

The image forming apparatus 101 can execute a variety of jobs. An example of these jobs is recited below.

Copy Function

Image data of an image of a document read in the scanner 102 is recorded in the storage 106 and printing is performed by using the printer 104.

Image Send Function

The image data obtained from the scanner 102 is transmitted to the computer 109 via the LAN 108.

Image Storing Function

The image data obtained from the scanner 102 is stored in the storage 106, and transmission and printing of the image data are performed if necessary.

Image Print Function

For example, a page description language transmitted from the computer 109 is analyzed and printed by the printer 104.

FIG. 2 is a block diagram for describing a hardware configuration of the controller 103 of the image forming apparatus 101 according to the embodiment.

The controller 103 is equipped with a main board 200 and a sub board 220. The main board 200 is a so-called general-purpose CPU system. The main board 200 has a main CPU 201 that controls the entire board, a boot ROM 202 that stores a boot program, and a memory 203 that is used as a work memory by the main CPU 201. Furthermore, the main board 200 has a bus controller 204 that has a bridge function with an external bus, a non-volatile memory 205 whose content is not erased even when the power supply is off, and an RTC (Real Time Clock) 211 that has a clock function. The main board 200 furthermore has a disk controller 206 that controls the storage 106, a flash disk (such as an SSD) 207 which is a relatively low capacity non-volatile storage device consisting of semiconductor devices, and a USB controller 208 that can control a USB. In this manner, a USB memory 209, the console unit 105, the storage 106, and the like are connected externally to the main board 200. A network interface 210 connects to the computer 109 via the LAN 108, and controls transmission/reception data to and from the computer 109.

The sub board 220 has a comparatively small general-purpose sub-CPU system, and image processing hardware. The sub board 220 has a sub CPU 221 that controls the entire board, a memory 223 to be used as a work memory for the sub CPU 221, a bus controller 224 that has the bridge function with an external bus, and a non-volatile memory 225 whose content is not erased even when the power supply is off. The sub board 220 furthermore has an image processor 227 that performs digital image processing in real time, and engine controllers 226 and 228 that control the printer 104 and the scanner 102, respectively. The scanner 102 and the printer 104 perform a transfer of digital image data via the engine controller 226 which is a printer controller, and the engine controller 228 which is a scanner controller. Also, the facsimile unit 107 performs direct control of the sub CPU 221.

Note that, FIG. 2 shows a simplified block diagram. For example, the main CPU 201, the sub CPU 221, and the like include a large number of hardware around the CPU such as chipsets, bus bridges, and clock generators, and the like, but these are unnecessary for the description of the exemplary embodiment, so they are described in a simplified manner.

Subsequently, regarding control processing by the controller 103, copying an image onto a sheet, for example, is described as an example.

When a user instructs a copy of an image from the console unit 105 at this time, the main CPU 201 sends image reading instructions to the scanner 102 via the sub CPU 221. By this, the scanner 102 optically scans and reads the document, converts that document image into the corresponding digital image data, and inputs the image data to the image processor 227 via the engine controller 228. The image processor 227 temporarily stores the digital image data in the memory 223 by a DMA transfer. When the main CPU 201 confirms that a specific amount or all of the digital image data in the memory 223 has been stored, it issues an image print instruction to the printer 104 via the sub CPU 221. When the sub CPU 221 instructs the image processor 227 of an address of image data in the memory 223, the image processor 227 transmits the image data of the memory 223 to the printer 104 in accordance with a synchronization signal from the printer 104. In this manner, the image data is transmitted to the printer 104 via the image processor 227 and the engine controller 226 under the control of the sub CPU 221, and the digital image data is printed by the printer 104 on a sheet.

In a case of printing multiple copies, the main CPU 201 stores the image data of the memory 223 in the storage 106, and from the second copy onward, the image data read from the storage 106 can be outputted to and then printed by the printer 104 without obtaining the image data from the scanner 102.

Also, the controller 103 of the image forming apparatus 101 according to the embodiment is not limited to being configured by a main board and a sub board as in FIG. 2.

Figure 3A:
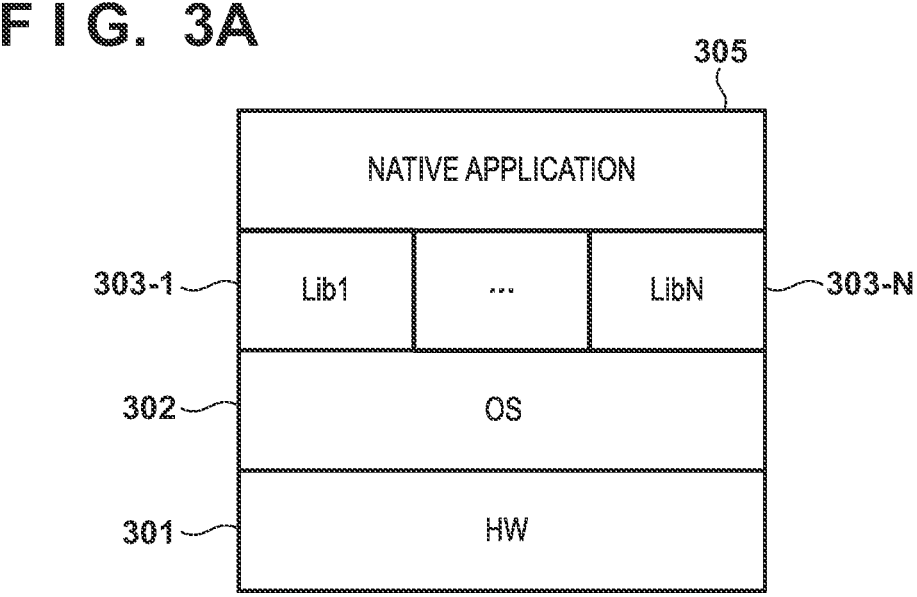
FIGS. 3A and 3B depict views for describing software system configurations for a native application and a virtual machine in a typical image forming apparatus.
Figure 3B:
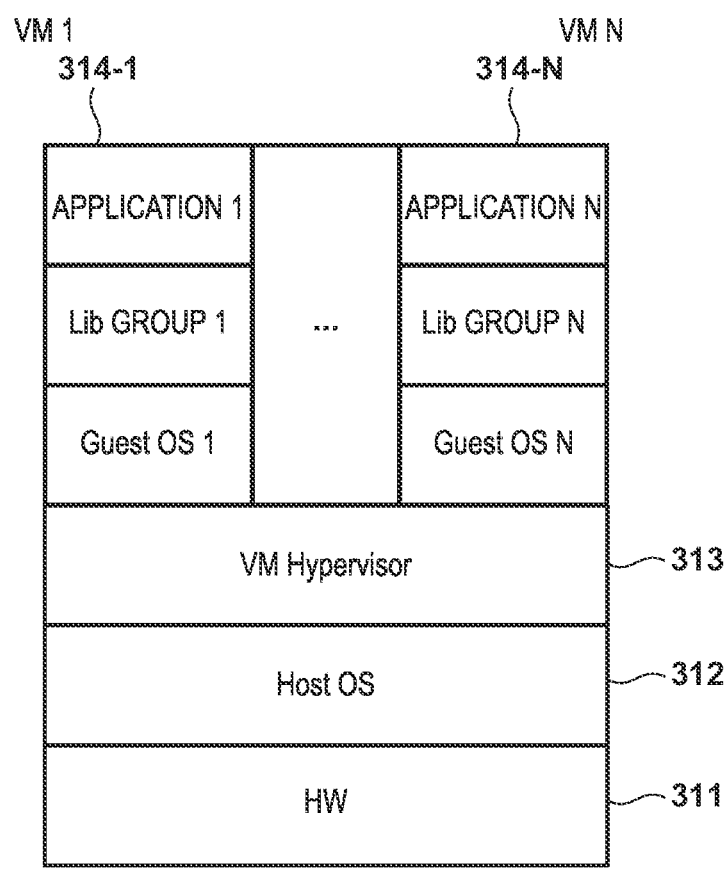

FIGS. 3A and 3B depict views for describing software system configurations for a native application and a virtual machine in a typical image forming apparatus.

FIG. 3A depicts a view for describing a native application. Hardware (HW) 301 required for operation, an operating system (OS) 302 for managing it, and a libraries group 303-1 to 303-N for providing functions to a native application 305 is present in the native application. In a case where the native application 305 operates and provides a function to the user at this time, the native application 305 accesses resources of the operating system 302 and the hardware 301 by using the libraries group 303-1 to 303-N.

In the software system illustrated in FIG. 3A, besides libraries and an operating system component used in order for the native application 305 to operate, there are libraries or an operating system component that are not used. For this reason, the system becomes bloated and the memory capacity is consumed by a large amount.

FIG. 3B depicts a view for describing a virtual machine.

An operating system (host OS) 312 and virtual software called a virtual machine hypervisor (VM Hypervisor) 313 exist on the hardware (HW) 311. Also, a plurality of virtual machines 314-1 to 314-N operates on the virtual machine hypervisor 313. These virtual machines 314-1 to 314-N access the hardware 311 via the hypervisor 313. By this, it becomes possible for a plurality of systems to share hardware.

As described above, a virtual machine system has the portability of a virtual machine compared to the native environment, and can be executed in an environment that the virtual machine hypervisor 313 has been installed. Also, in operation, a virtual machine is created from a virtual machine file called as an image when needed and the virtual machine is shut down when it is no longer in use, so that a native application can effectively use resources.

However, similar to the native system, since a virtual machine system has a large number of unused software components, storage is easily wasted, and a long time is needed from the startup of the image forming apparatus to the provision of functions.

Figure 4A:
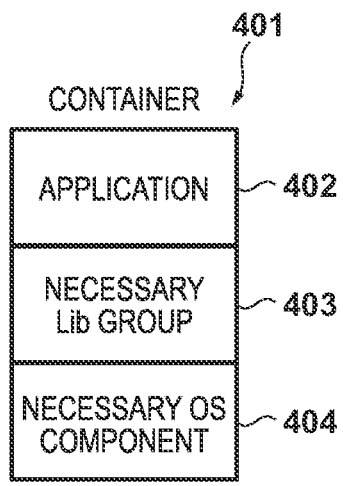
FIGS. 4A and 4B depict views for describing a container technique according to the embodiment.
Figure 4B:
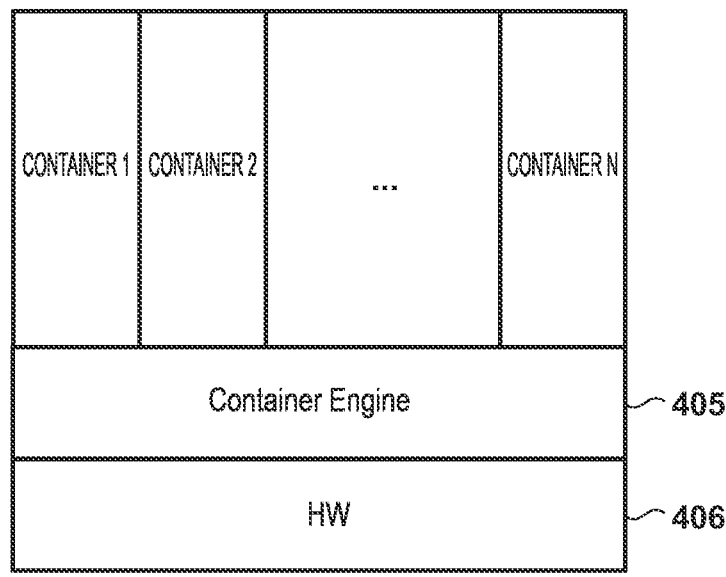

FIGS. 4A and 4B depict views for describing a container technique according to the embodiment.

In recent years, a new virtualization technology called a container is being used. A virtual machine means that a plurality of software systems shares one hardware. In a case of a virtual machine, as illustrated in FIG. 3B, it is assumed that a guest OS 1 to a guest OS N exist entirely on the host OS 312, and the library groups thereon are all present from the Lib group 1 to the Lib group N (similar to the native application system).

Meanwhile, as in FIG. 4A, in a case where a container technique is applied, a container 401 includes a libraries group 403 and an OS component 404 which are necessary for the execution of an application 402. This container technique collectively containerizes the necessary library and OS parts and their settings when executing an application. This container operates on a container engine (the Docker Engine, for example) in the execution environment. At this time, the container engine absorbs a difference between the container and the hardware. As described above, since the container only holds necessary software components, it has an advantage of being lightweight, having high portability, and of running in any execution environment (as long as there is a container engine).

FIG. 4B depicts a view for describing a case where a plurality of containers are operated. In FIG. 4B, containers 1 to N are operating on a container engine 405. This container engine 405 absorbs a difference between the hardware 406 and the containers 1 to N.

Note, such a container is created based on a model or the template of a container called a container image file by using a dedicated tool. Also, when a new function is provided to an apparatus, an example (instance) of a container is generated by using this image file. Additionally, by executing this instance on software called a container engine 405, the function can be provided. Furthermore, when the function becomes unnecessary, resources are freed by stopping or deleting the instance.

Such a container technique, compared to a conventional virtual machine, contains only the necessary software components, so even if an application for providing new functions is implemented, the memory capacity consumed by this is relatively small. For this reason, overhead (time for startup, resources, and the like) for providing a new function becomes small and it is possible to flexibly support in a case where the number of accesses is difficult to predict and the like. For example, in a case of an online shopping site where the number of users is indefinite, when access by users occurs and the number of accesses increases, a new instance can be launched to provide further functions. Also, in a case where the access ends, the instance is deleted and it is possible to release the occupied area of the memory.

When comparing a container technique with a virtual machine as described above, there are the following advantages in the container technique.
(1) Since unnecessary software components can be excluded, the amount of memory consumed is small and the overhead at startup is small.
(2) If there is the container engine 405 having a fixed portability similar to the virtual machine, execution is possible. Also, installation of an application is unnecessary as with a native application.

Figure 5:
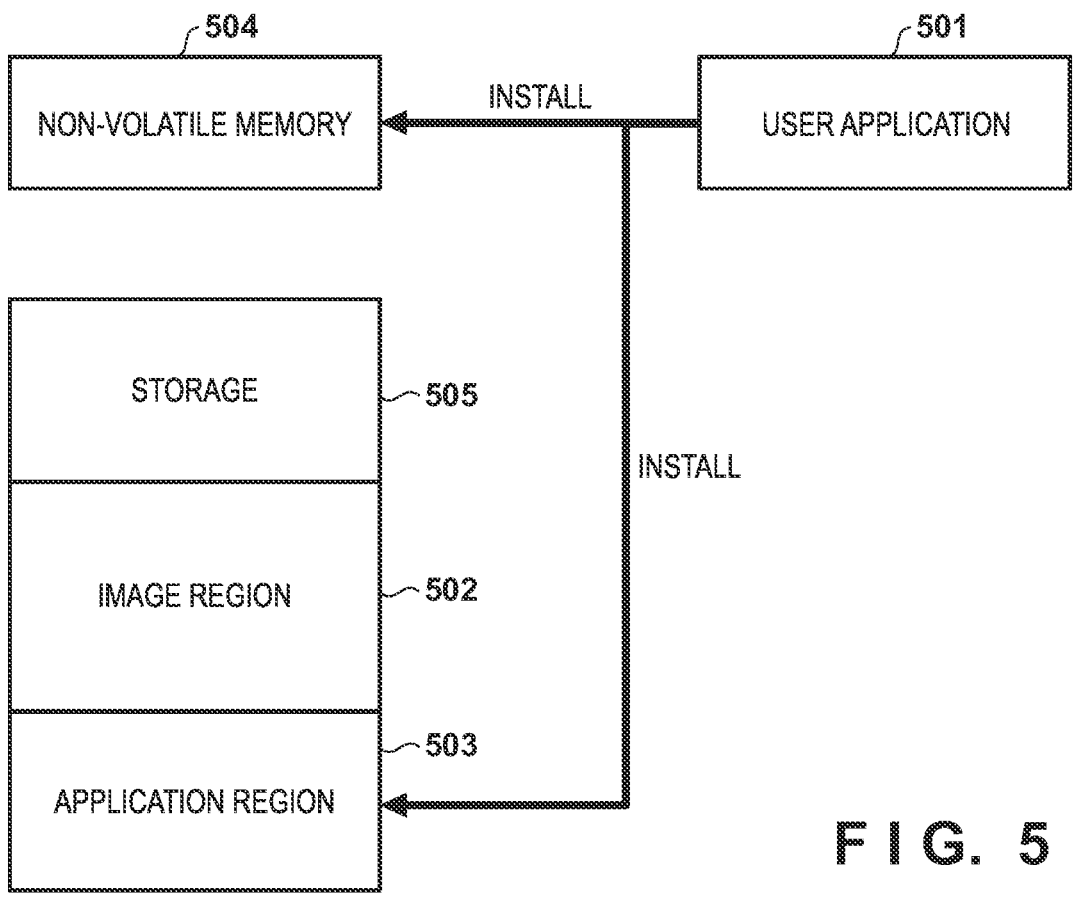
FIG. 5 depicts a view for describing a problem to be solved in a case of a conventional technique or in a case where the conventional technique uses a container.

FIG. 5 depicts a view for describing a problem to be solved in a case of a conventional technique or in a case where the conventional technique uses a container.

In a case of the conventional technique (native application), it is necessary to install a user application 501 to a non-volatile memory 504 prior to the user utilizing the application. As described above, since installing the user application 501 prior to utilization is necessary, a burden is put on the administrator.

For example, in a case of an image forming apparatus, installing the user application 501 to the non-volatile memory 504 or a storage 505 is necessary. Which application to install, upgrades of the application, or the like are managed by the administrator.

Meanwhile, in a case where the image forming apparatus is an apparatus for realizing mainly fundamental functions such as printing and scanning, a region for storing an application for realizing an extended function is not large.

In FIG. 5, because the non-volatile memory 504 is a storage for storing programs for controlling the image forming apparatus, only a minimal capacity is held, and therefore, installing on the non-volatile memory 504 an application for realizing an extended function is not desired.

Meanwhile, in a case of the storage 505, at a time of copying, prior to printing image data obtained by a scan, the amount of data of an image region 502 for temporary storage becomes large and the amount of memory of an application region 503 which is a region used for storage of the user application 501 becomes small.

To summarize what was described above, the user application 501 to be used needs to be installed to the application region 503 of the storage 505. However, in a case where the capacity of the application region 503 is, for example, only a few GB, each user application 501 consumes a memory capacity of about several tens of MB to several hundreds of MB. For this reason, normally, configuration is taken so that the number of applications that can be installed is restricted to about 10. In a case where the container technique is utilized, this is slightly improved.

Meanwhile, due to the spread of coworking spaces (a plurality of companies and organizations sharing offices) and free address systems (not having fixed seats) in the world, it is expected that the number of users who will use an image forming apparatus will increase more than in the past. As described above, assuming a situation in which users from different organizations and occupation types use different applications in the same workplace, when installing native applications in a local storage to provide functionality, as in the current technique, there is a possibility that the storage becomes full and providing sufficient functions is impossible.

Figure 6:
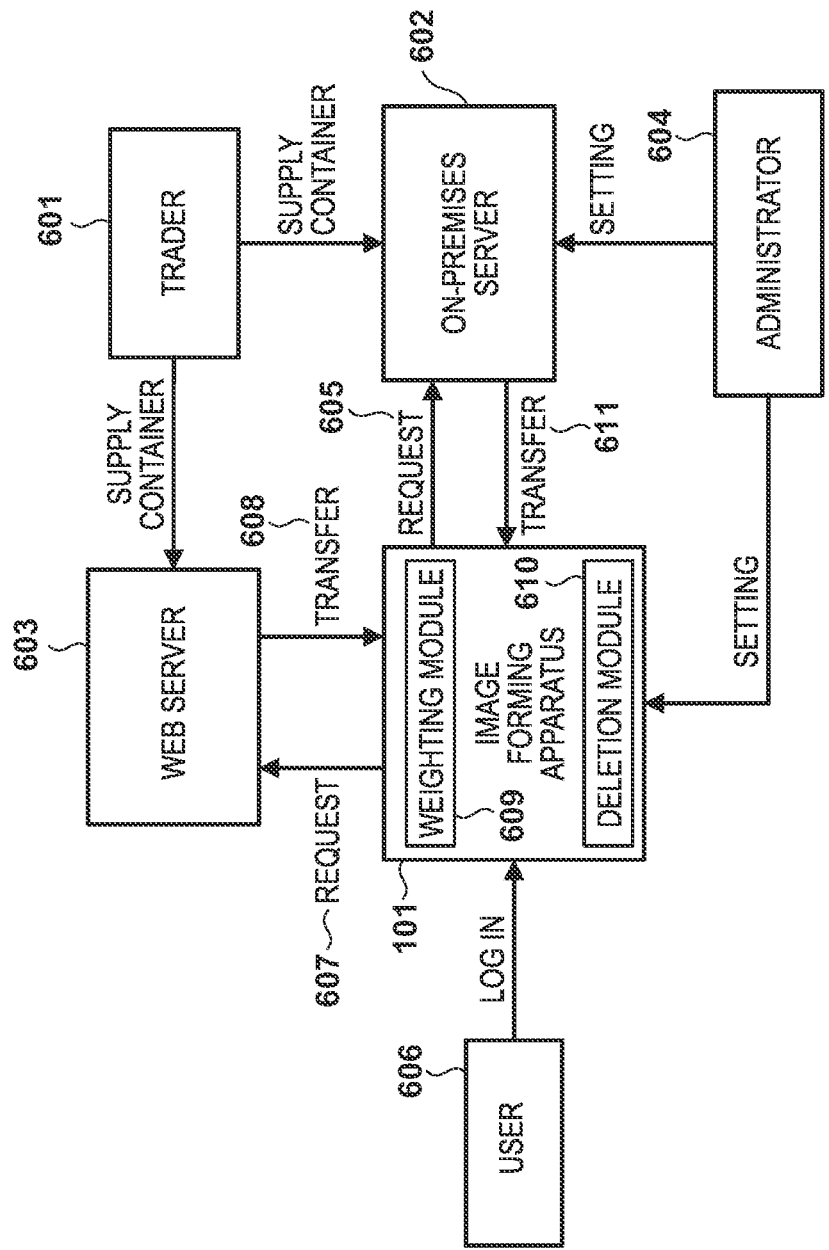
FIG. 6 depicts a view for describing a system configuration including the image forming apparatus according to the embodiment.

FIG. 6 depicts a view for describing a system configuration including the image forming apparatus 101 according to the embodiment. Here, in order to solve the above described problem, a technique is proposed in which applications that have been containerized are placed into a server and the image forming apparatus 101 obtains containers from the server as needed.

A trader 601 converts existing applications into a container and supplies it to an on-premises server 602 and a Web server 603 of the user. Since capacity is restricted in the on-premises server 602, an application having a relatively high frequency of utilization or an application that has been designated by the user is stored in the on-premises server 602. Note, on-premises here means an information system such as a server or software installed and operated within a facility which a user (a company in a case of business use) manages. Meanwhile, an administrator 604 of the user side performs settings for the on-premises server 602 and the image forming apparatus 101 and inputs an obtainment destination and the like of an application container (simply referred to as a container hereinafter).

Next, a user 606 logs into the image forming apparatus 101. The image forming apparatus 101 transmits a request 605 for a containerized application to the on-premises server 602 in accordance with a profile of a logged-in user and a user operation. The on-premises server 602 transfers a containerized application 611 to the image forming apparatus 101 in accordance with the request 605.

At this time, in a case where a container which was requested by the image forming apparatus 101 is not in the on-premises server 602, the image forming apparatus 101 transmits a request 607 to the Web server 603 and obtains the requested containerized application 608 from the Web server 603. Also, after a user has utilized the function, the container (or a part thereof) is deleted. By this, it is possible to reduce the occupied amount of memory area of the storage 106 in the image forming apparatus 101.

A weighting module 609 performs weighting of an application stored in the storage 106. Then, when the user 606 logs out, configuration is taken such that, by a deletion module 610 deleting, in accordance with the weighting, the containerized application stored in the storage 106, it is possible free capacity of the storage 106 not to become less than or equal to a predetermined amount. These processes are described later in more detail with reference to the flowchart and the like of FIG. 9.

FIGS. 7A and 7B depict views illustrating one example of a classification of profiles and applications of users in the image forming apparatus 101 according to the embodiment. For the sake of simplicity of the description hereinafter, in a case where an application is containerized, this is one embodiment indicating an example of classification of users or applications and is not necessarily something that is essential for the solution of the present invention. Note, the purpose of this classification is to limit the utilization amount of the storage by retrieving applications that are likely to be used according to a profile of a user.

FIG. 7A illustrates one example of a profile of a user to use the image forming apparatus 101.

When "role" is referenced and classified, an employee can be classified as "an executive", "managerial staff", "regular staff", "commission" and the like. Also, when "occupation type" is referenced and classified, an employee can be classified as "accounting", "planning", "human resources", "marketing", "intellectual property", "research and development", "quality assurance", "manufacturing", "sales", and the like. Also, a single employee here can belong to a plurality of groups. For example, Person A may belong to the "regular staff" group and the "marketing" group, and Person B may belong to the "managerial staff" group and the "research and development" group. Also, the administrator associates these groups with predetermined containers.

FIG. 7B depicts a view for describing classifications of applications.

Here, a "fundamental application" is an application that anyone can use (such as a network print, for example). For this reason, the "fundamental application" is always held in the image forming apparatus 101 in the embodiment. A "group application" is an application linked to a group. For example, in a case of "marketing", business card management software and the like are applications linked to the "marketing" group. Accordingly, when a user of the "marketing" group, for example, logs in, the image forming apparatus 101 obtains a container of the business card management software from the server. This group application is stored in the on-premises server 602 because, normally, it is needed to be designated in advance.

A "personal application" is an application that a user personally designated. For example, in a case of Person A from marketing, since Person A performs sales visits, a "schedule management" application is designated for managing schedule information.

An "other application" is an application that does not belong to any of the above described groups. For example, although a user is not designated in advance, the "other application" is specified while the user is using the image forming apparatus 101.

As described above, the image forming apparatus 101 can obtain a necessary application from a server in accordance with a profile of a logged-in user.

Figure 8:
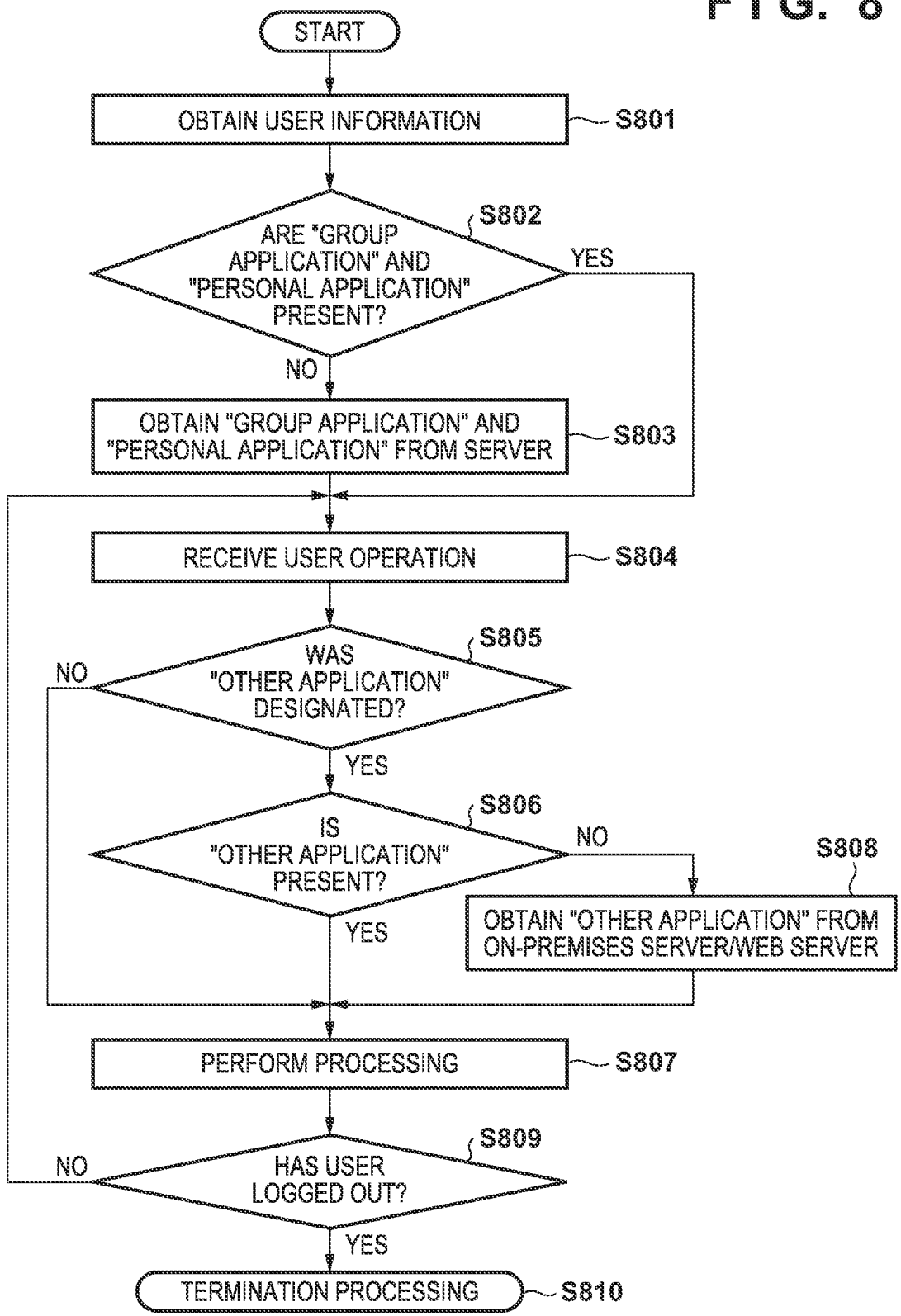
FIG. 8 is a flowchart for describing processing for obtaining and executing an application in the image forming apparatus according to the embodiment.

FIG. 8 is a flowchart for describing processing for obtainment and execution of an application in the image forming apparatus 101 according to the embodiment. Note, the processing described in this flowchart is realized by the main CPU 201 (simply, the CPU 201 hereinafter) executing a program deployed to the memory 203. The processing is started by a user logging into the image forming apparatus 101. Here, when the user succeeds in authentication by inputting a password, holding a card, or the like, the CPU 201 identifies the user and then executes the following processing. Note, an application described hereinafter means a containerized application.

Firstly, in step S801, the CPU 201 queries a server and obtains user information of the user that logged in or obtains user information written to a login card. Note, at this time, in a case where the image forming apparatus 101 stores user information of the user that logged in, a query to the server is not performed. Next, the processing advances to step S802, and the CPU 201 determines, based on the user information, whether an application linked to a "group" to which the user belongs and a "personal application" which was designated by the user are present in the image forming apparatus 101. Here, in a case where it is determined that these are not present, the processing advances to step S803, and the CPU 201 obtains the application from the server and the processing advances to step S804. Meanwhile, in a case where it is determined that these are present in the image forming apparatus 101 in step S802, the processing advances to step S804 as is.

In step S804, the CPU 201 receives a user operation by the user. Then, the processing advances to step S805, and the CPU 201 determines whether or not an "other application" is further designated by the user operation. Here, in a case that an "other application" is not designated, the processing advances to step S807 since the processing is processing by a "group application" or a "personal application" obtained in step S803. On the other hand, in a case that an "other application" is designated in step S805, the processing advances to step S806, and the CPU 201 determines whether or not the "other application" is present in the image forming apparatus 101. Here, in a case where it is determined to not be present, the processing advances to step S808, and the CPU 201 obtains the "other application" from the on-premises server 602 or the Web server 603 and the processing advances to step S807. On the other hand, in step S806, in a case where it is determined that the "other application" is present in the image forming apparatus 101, the processing advances to step S807. In step S807, the CPU 201 performs processing by executing a "group application", a "personal application", or an "other application" designated by the user. Then, the processing advances to step S809, and the CPU 201 determines whether or not the user has logged out, ends the processing when the user has logged out, and when the user has not logged out, the processing advances to step S804, and the CPU 201 executes the processing according to the user operation. Note, when the user has logged out, the processing advances to step S810, and the CPU 201 performs termination processing then waits for the next user to login.

By virtue of this processing as described above, by configuring such that, prior to an operation by a user, an application linked to user information of a logged-in user or a personal application that the user designated can be obtained and executed in advance, it is possible for the logged-in user to immediately execute desired processing. Also, since applications are obtained only after a user logs in, it is possible to prevent the memory of the storage of the image forming apparatus from being always monopolized by these applications.

Further, since applications other than applications related to the logged-in user are obtained from an external server only after the user instructs so, it is possible to prevent the memory of the storage of the image forming apparatus from being always monopolized by these applications.

Figure 9:
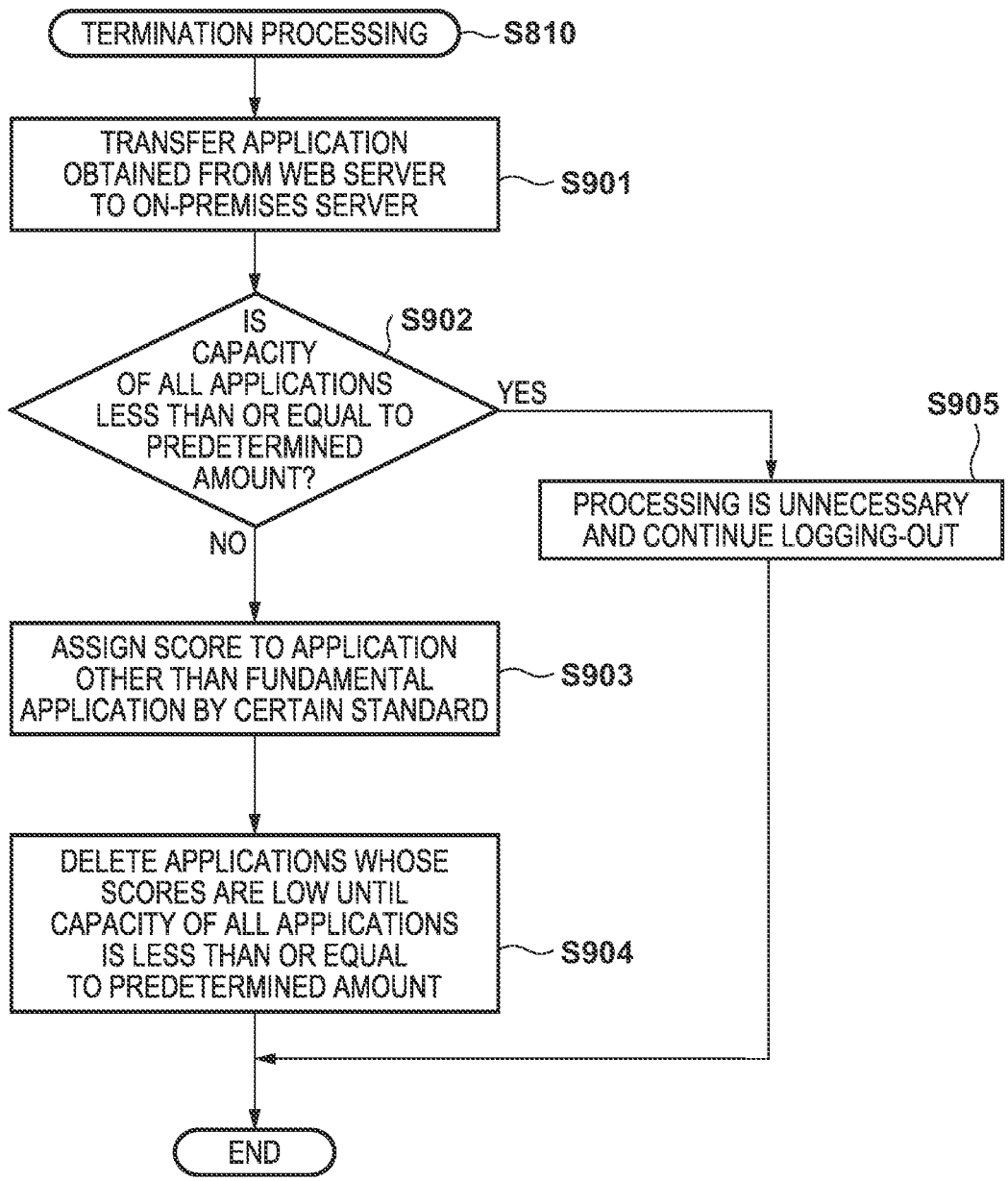
FIG. 9 is a flowchart for describing termination processing in the image forming apparatus according to the embodiment.

FIG. 9 is a flowchart describing the termination processing in step S810 of the image forming apparatus 101 according to the embodiment. Also, the processing shown by this flowchart is realized by executing a program deployed by the CPU 201 in the memory 203. The processing involves the image forming apparatus 101 freeing the memory capacity of the storage 106 after the user logs out, so that it can be used when the next user logs in.

When the image forming apparatus 101 starts the termination processing, the processing advances to step S901, and the CPU 201, in a case where a previous user who had logged out obtained an application from the Web server 603 when logged in, transfers this application to the on-premises server 602. This is because, since the application not in the on-premises server 602 was being used, there is a possibility that the application will be used again thereafter, and so the application is held in the on-premises server 602. Because the application being transferred from the Web server 603 to the on-premises server 602 results in putting pressure on the bandwidth, it is also desirable that the application is transferred from the image forming apparatus 101 to the on-premises server 602. In other words, the on-premises server 602 functions as cache of the Web server 603.

Next, the processing advances to step S902, and the CPU 201 determines whether a free memory capacity of the storage 106 is greater than or equal to a predetermined amount (whether the capacity of the installed application is less than or equal to a predetermined amount). If this is the case, the processing advances to step S905 in which the processing is unnecessary, and the CPU 201 continues logout processing and ends this termination processing.

Meanwhile, in a case where the CPU 201 in step S902 determines that the free memory capacity of the storage 106 is less than the predetermined amount, in other words, the capacity of all stored applications is greater than or equal to the predetermined amount, the processing advances to step S903 since the applications puts pressure on the memory capacity of the storage 106. The CPU 201 in step S903 scores applications other than the fundamental applications among the applications stored in the storage 106 based on a certain standard. Then, the processing advances to step S904, the CPU 201, in order of the lowest score, deletes the applications from the storage 106 until the free memory capacity of the storage 106 becomes greater than or equal to the predetermined amount, in other words, until the capacity of all applications becomes less than the predetermined amount, and ends this processing.

Note, as the certain standard for scoring (weighting) an application in step S903 here, for example, a standard based on a characteristic of the application, the usage status of the application, or the like can be considered as shown below.
(1) The score is decreased the larger the size of the application (an occupied memory capacity of the storage 106) is.
(2) The score is increased the larger the frequency in use of the application is within a predetermined amount of time.
(3) The score is increased the larger the number of users of the application is.
(4) The score is increased the closer a latest date and time at which the application was used is to a current date and time.

As described above, by deleting applications, which a user who had logged out used, other than the fundamental applications, when the user logs out, it is possible to prevent the free memory capacity of the storage 106 from becoming less than the predetermined amount.

One example is described here. Here, the flow from Person A from marketing logging in to the image forming apparatus 101 to logging out is described.

Person A from marketing is normally in charge of sales visits and manages his own schedule by a calendar application. In this schedule, times, places, and customer names are described. When Person A logs into the image forming apparatus 101, the image forming apparatus 101 identifies the location of Person A (close to the image forming apparatus 101).

Next, predetermined applications linked to the group that Person A belongs to are obtained. The predetermined applications are, for example, a calendar application, a map application, a mail application, and the like. Then, the next appointment (time and place) is confirmed by the calendar application and the time required to travel is calculated by the map application. Also, the time at which it is necessary to depart is calculated and the user (Person A) is notified by the mail application. Transmission of mail, and output of a map and directions are presented.

For example, Person A logs into the image forming apparatus of the Ikebukuro office at 15:00 and his next appointment is in Shibuya at 16:00 (the travel time including walking is 30 minutes). Here, since Person A is to arrive in Shibuya 15 minutes earlier at 15:45, it is necessary that he depart Ikebukuro at 15:15. Such information is presented to the Person A and transmission of mail, printing, or the like is performed.

Then, when Person A logs out, whether or not the capacity of the above-described calendar application, the map application, and the mail application is greater than or equal to a predetermined amount is determined, and if this is the case, the containerized applications are deleted from the storage 106 in accordance with the above-described scoring.

FIG. 10 depicts a view for describing obtainment of an application in the image forming apparatus 101 according to the embodiment.

The user or administrator can select a function that is desired to be transferred from a server 1000 when logging into the image forming apparatus 101. At this time, the trader containerizes conventional applications and stores them into the server 1000 in advance. Here, for the sake of management, IDs are assigned to each of the application containers and a relationship and the like between the container name, version, ID, and user group are stored in an application list 1001.

When the image forming apparatus 101 is supplied (or when manufactured), the application list 1001 is sent from the server 1000 and is saved in the image forming apparatus 101. For the application saved in the image forming apparatus 101 in this manner, the contents are updated at a timing at which obtainment, deletion, update, or the like is performed.

At this time, the user operates the console unit 105 of the image forming apparatus 101 and, for example, a function 2 and a function N are selected as functions to be used as the personal applications of the user. By this, containers of an application 2 and an application N linked to these functions are selected. Then, the user on the image forming apparatus 101 identifies the ID of these containers in an application list 1002 in the image forming apparatus 101. By this, the image forming apparatus 101 obtains the containers of each corresponding application from the server 1000, and the image forming apparatus 101 has the functions 2 and N corresponding to these application 2 and N.

Note, in FIG. 10, the server 1000 synchronizes with the Web server of the trader and utilizes the container that the trader created from that Web server. Meanwhile, in a case of a container that a user created on their own, the containerized application is stored only in the server 1000.

Also, it is possible to switch to processing by the image forming apparatus 101 or to processing by the server 1000 in accordance with the processing contents of the application. In a case where the reaction time for operation of a user is taken into consideration, the processing by the image forming apparatus 101 is desirable. Meanwhile, in a case in which processing performance is emphasized, there may be a case in which execution by the server 1000 is more desirable than execution by the image forming apparatus 101.

As explained above, in a case of a containerized application, the portability is high, and the same application can be executed by the image forming apparatus 101 or the server 1000 (also the on-premises server and Web server). For this reason, compared to conventional native execution, not only will the number of extendable functions increase, but by utilizing the performance of the server 1000, extension of functions which could not be realized only by the image forming apparatus 101 also becomes possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-018214, filed Feb. 5, 2020, which is hereby incorporated by reference herein in its entirety.

What is claimed is:

1. An information processing apparatus operable to install and execute an application for providing an extended function, the information processing apparatus comprising:

one or more controllers including at least one processor and at least one memory, the one or more controllers being configured to function as:

an obtaining unit that obtains, from a server, a containerized application linked to a logged-in user or designated by the logged-in user;

a storing unit that stores the containerized application obtained by the obtaining unit;

a weighting unit that applies weighting to each of a plurality of containerized application stored in the storing unit in accordance with a characteristic or a usage state of the containerized application when a free capacity of the storing unit becomes less than or equal to a predetermined amount; and a deleting unit that deletes, based on the weighting of each of the containerized applications, a containerized application among the plurality of containerized applications stored in the storing unit until the free capacity of the storing unit becomes greater that the predetermined amount in accordance with a logout of the logged-in user.

2. The information processing apparatus according to claim 1, wherein the weighting applied to a containerized application by the weighting unit decreases in accordance with a size of the containerized application being larger.

3. The information processing apparatus according to claim 1, wherein the weighting applied to a containerized application by the weighting unit increases in accordance with a frequency in use of the containerized application is within a predetermined amount of time being higher.

4. The information processing apparatus according to claim 1, wherein the weighting applied to a containerized application by the weighting unit increases in accordance with a number of users of the containerized application being larger.

5. The information processing apparatus according to claim 1, wherein the weighting applied to a containerized application by the weighting unit increases in accordance with a latest date and time at which the containerized application was used being closer to a current date and time.

6. The information processing apparatus according to claim 1, wherein the deleting unit deletes a containerized application in an order starting from a containerized application for which the weighting is smallest.

7. The information processing apparatus according to claim 1, wherein the containerized application that the obtaining unit obtains from the server is a containerized application linked to user information of the logged-in user.

8. The information processing apparatus according to claim 1, wherein the deleting unit deletes the obtained containerized application when a free capacity of the storing unit is less than or equal to a predetermined amount.

9. The information processing apparatus according to claim 1, wherein the obtaining unit obtains the containerized application from the server only if the information processing apparatus does not have the containerized application linked to the logged-in user or designated by the logged-in user.

10. The information processing apparatus according to claim 1, wherein the containerized application includes an application, a library and an operating system (OS), and operates on a container engine.

11. A method of controlling an information processing apparatus operable to install and execute an application for providing an extended function, the method comprising:

obtaining, from a server, a containerized application linked to a logged-in user or designated by the logged-in user;

storing in a memory the obtained containerized application;

applying a weighting to each of a plurality of containerized application stored in the memory in accordance with a characteristic or a usage state of the containerized application when a free capacity of the storing unit becomes a predetermined amount or less; and deleting, based on the weighting of each of the containerized applications, a containerized application among the plurality of containerized applications stored in the memory until the free capacity of the storing unit becomes greater than the predetermined amount in accordance with a logout of the logged-in user.

12. A non-transitory computer-readable storage medium storing a program for causing a processor to execute a method of controlling an information processing apparatus operable to install and execute an application for providing an extended function, the method comprising:

obtaining, from a server, a containerized application linked to a logged-in user or designated by the logged-in user;

storing in a memory the obtained containerized application;

applying a weighting to each of a plurality of containerized application stored in the memory in accordance with a characteristic or a usage state of the containerized application when a free capacity of the storing unit becomes a predetermined amount or less; and deleting, based on the weighting of each of the containerized applications, a containerized application among the plurality of containerized applications stored in the memory until the free capacity of the storing unit becomes greater than the predetermined amount in accordance with a logout of the logged-in user.

* * * * *